United States Patent
Jiang et al.

(10) Patent No.: US 12,235,517 B2
(45) Date of Patent: Feb. 25, 2025

(54) LARGE-APERTURE FOUR-PIECE OPTICAL LENS

(71) Applicant: YEJIA OPTICAL TECHNOLOGY (GUANGDONG) CORPORATION, Dongguan (CN)

(72) Inventors: Cheng Jiang, Dongguan (CN); Jun She, Dongguan (CN); Jixue Nan, Dongguan (CN)

(73) Assignee: YEJIA OPTICAL TECHNOLOGY (GUANGDONG) CORPORATION, Dongguan (CN)

( * ) Notice: Subject to any disclaimer, the term of this patent is extended or adjusted under 35 U.S.C. 154(b) by 611 days.

(21) Appl. No.: 17/566,010

(22) Filed: Dec. 30, 2021

(65) Prior Publication Data

US 2022/0229270 A1     Jul. 21, 2022

(30) Foreign Application Priority Data

Jan. 18, 2021   (CN) .......................... 202110064542.5

(51) Int. Cl.
  *G02B 9/34*     (2006.01)
  *G02B 13/00*    (2006.01)
  *G02B 13/18*    (2006.01)

(52) U.S. Cl.
  CPC .............. *G02B 9/34* (2013.01); *G02B 13/004* (2013.01); *G02B 13/18* (2013.01)

(58) Field of Classification Search
  CPC ................................ G02B 13/004; G02B 9/34
  See application file for complete search history.

(56) References Cited

U.S. PATENT DOCUMENTS

| 7,433,135 | B2 * | 10/2008 | Sun .................. G02B 13/18 359/569 |
| 7,885,009 | B2 * | 2/2011 | Baba ................. G02B 9/34 359/651 |
| 8,704,937 | B2 * | 4/2014 | Matsusaka .......... G02B 13/004 348/340 |

FOREIGN PATENT DOCUMENTS

| JP | 05011184 A | * | 1/1993 | |
| JP | H11190820 A | * | 7/1999 | |
| JP | 2004341501 A | * | 12/2004 | ......... G02B 13/0035 |
| JP | 2007127953 A | * | 5/2007 | ......... G02B 13/0035 |
| KR | 20210027185 A | * | 3/2021 | |
| WO | WO-2004102247 A1 | * | 11/2004 | ............. G02B 13/04 |

* cited by examiner

*Primary Examiner* — Christopher Stanford
(74) *Attorney, Agent, or Firm* — Troutman Pepper Locke LLP; Tim Tingkang Xia, Esq.

(57) ABSTRACT

A large-aperture four-piece optical lens includes a first lens with positive focal power, a second lens with negative focal power, a third lens with positive focal power and a fourth lens with positive focal power which are sequentially arranged. A back of the fourth lens is provided with an image surface, an aperture diaphragm is arranged at a front end of the first lens or between the second lens and the third lens, and a vignetting diaphragm is arranged on an S7 surface of the fourth lens. An equivalent focal length of the fourth lens is greater than that of the third lens, and the equivalent focal length of the fourth lens is greater than that of the first lens. Each lens has a low sensitivity to an axial tolerance and a low assembly difficulty, and an energy utilization rate can be improved by increasing a numerical aperture.

7 Claims, 9 Drawing Sheets

LARGE-APERTURE FOUR-PIECE OPTICAL LENS

CROSS-REFERENCE TO RELATED PATENT APPLICATION

This application claims priority to and the benefit of Chinese Patent Application No. CN202110064542.5 filed in China on Jan. 18, 2021. The disclosure of the above application is incorporated herein in its entirety by reference.

TECHNICAL FIELD

The present invention relates to an optical lens, and more particularly, to a large-aperture four-piece optical lens.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

In traditional technologies, a headlight lens based on a projection principle is composed of a light source, a light energy collecting member, a cut-off line structure and a convex lens.

A light digital projection technology is used in a newly developed pixel headlight which is also known as a matrix headlight, so that the headlight not only has a lighting function, but also can project patterns on the ground, such as weather conditions, road navigation, or other symbols for identification by people outside a vehicle. An optical system of the pixel headlight mainly comprises an illuminable pixel (such as mini LED, micro LED, LCD screen, LCOS or lightened DMD digital microlens) and a projection optical lens. In order to make the projection pattern clearly visible, the lens needs to have a good optical performance: chromatic aberration, field curvature, astigmatism and other optical aberrations are eliminated.

For the optical lens in the prior art, a plurality of positive and negative lenses need to be properly combined for joint use, so as to eliminate aberration. A specific number of the optical lenses used is related to parameters, performance indexes, and used optical materials and optical processes of the optical lenses, and a slightly complicated optical lens may be provided with more than 10 lenses. The optical lens currently used in a mobile phone is provided with more than 6 lenses, with a high cost.

In traditional technologies, the imaging quality of a Cook's three-piece lens is difficult to meet requirements. FIG. 1 shows a classic four-piece three-set Tessar lens, which is evolved from the Cook's three-piece lens, that is, the last set of single convex lenses is a double-cemented lens. The Tessar lens has sharp imaging and good correction for various aberrations, but a numerical aperture of original design is small, and is generally only about 0.125 and less than 0.2, which means that a utilization rate of light energy is extremely low, and the lenses need to be adjusted very accurately in assembly and use, with small tolerance and high use requirements. A four-piece double Gauss lens also has the above problems.

The headlight has both lighting and imaging functions. On one hand, a higher energy utilization rate and a higher brightness are needed, and on the other hand, there are certain image quality requirements for a projected image, especially low chromatic aberration. In addition, due to a particularity of automobile application, the optical lens needs to have a higher thermal reliability, a better vibration reliability and a lower mass, and in order to further improve the market competitiveness, a lower cost is needed at the same time.

The optical lens in the prior art cannot meet the performance requirements of a high energy utilization rate, a high imaging quality, a simple and stable structure and a low cost at the same time.

SUMMARY

Aiming at the problems in the prior art above, the present invention provides a large-aperture four-piece optical lens, which has a high energy utilization rate, a high imaging quality, a simple and stable structure and low manufacturing and using cost.

The large-aperture four-piece optical lens provided by the present invention comprises a first lens with positive focal power, a second lens with negative focal power, a third lens with positive focal power and a fourth lens with positive focal power, wherein the first lens, the second lens, the third lens and the fourth lens are arranged sequentially along a light incident direction from an object side to an image side, the first lens includes a first surface facing toward the object side and a second surface facing toward the image side, the second lens includes a third surface facing toward the object side and a fourth surface facing toward the image side, the third lens includes a fifth surface facing toward the object side and a sixth surface facing toward the image side, the fourth lens includes a seventh surface facing toward the object side and an eighth surface facing toward the image side, the first surface, the second surface, the third surface, the fourth surface, the fifth surface, the sixth surface, the seventh surface and the eighth surface are sequentially arranged along the light incident direction from the object side to the image side, an image plane is provided on the image side of the large-aperture four-piece optical lens to face the eighth surface, an aperture diaphragm is arranged on the object side of the large-aperture four-piece optical lens to face the first surface or arranged between the second surface and the third surface, a vignetting diaphragm is arranged on the seventh surface, the first surface, the second surface, the fifth surface, the sixth surface and the seventh surface are all convex surfaces, and the fourth surface is a concave surface;

a distance between the aperture diaphragm and a center of the large-aperture four-piece optical lens is ST, a distance between an object focal point of the large-aperture four-piece optical lens and the center of the large-aperture four-piece optical lens is $F_{obj}$, a distance between the aperture diaphragm and the object focal point of the large-aperture four-piece optical lens is $|ST-F_{obj}|$, and a focal length of the large-aperture four-piece optical lens is $f_0$, $|ST-F_{obj}|<0.7f_0$;

an effective diameter of light passing through the first surface is $d_1$, an effective diameter of light passing through the second surface is $d_2$, an effective diameter of light passing through the third surface is $d_3$, an effective diameter of light passing through the fourth surface is $d_4$, an effective diameter of light passing through the fifth surface is $d_5$, an effective diameter of light passing through the sixth surface is $d_6$, an effective diameter of light passing through the seventh surface is $d_7$, and an effective diameter of light passing through the eighth surface is $d_8$;

the effective diameters d of the light passing through the first surface to the eighth surface satisfy the following relationship: $d_i>0.9d_j$, $i<j$, i is an integer ranging from 1 to 7, and j is an integer ranging from 2 to 8;

a radius of curvature of the third surface is $r_3$, a radius of curvature of the fourth surface is $r_4$, $|r_4|<|r_3|$, a radius of curvature of the seventh surface is $r_7$, a radius of curvature of the eighth surface is $r_8$, $|r_7|<|r_8|$, an equivalent focal length of the fourth lens is greater than that of the third lens, and the equivalent focal length of the fourth lens is greater than that of the first lens; and a distance between centers of the sixth surface and the seventh surface is $G_{67}$, a distance between centers of the second surface and the third surface is $G_{23}$, and $G_{67}<G_{23}$.

Preferably, a back focal length of the large-aperture four-piece optical lens is greater than 2 mm.

Preferably, the eighth surface is a flat surface or a concave surface.

Preferably, the first surface, the second surface, the third surface, the fourth surface, the fifth surface, the sixth surface, the seventh surface and the eighth surface are spherical surfaces or aspherical surfaces.

Preferably, the first lens, the second lens, the third lens and the fourth lens are single lenses or cemented lenses.

Preferably, the first lens, the second lens, the third lens and the fourth lens are glass lenses or plastic lenses.

Further, an Abbe number of the first lens is $Vd_1$, an Abbe number of the second lens is $Vd_2$, an Abbe number of the third lens is $Vd_3$, and an Abbe number of the fourth lens is $Vd_4$, $Vd_1-Vd_2>25$, and $Vd_3-Vd_2>25$.

The present invention has the beneficial effects that: the present invention discloses the large-aperture four-piece optical lens, only four lenses are used in the lens, with a low manufacturing cost, a simple and stable overall structure, a good anti-vibration performance and a low lens mass, and the lenses have a low sensitivity to axial tolerance in assembly, with a large tolerance rate, a low assembly difficulty and a low assembly cost; and an energy utilization rate can be improved by increasing the numerical aperture, which can effectively improve a brightness of light distribution, and when applied to the projection imaging system, the optical lens has a good chromatic dispersion performance and a good image resolution, which means that the optical lens has a high imaging quality.

BRIEF DESCRIPTION OF THE DRAWINGS

The present invention will be described in detail below in conjunction with embodiments and accompanying drawings, in which.

Figure 1:
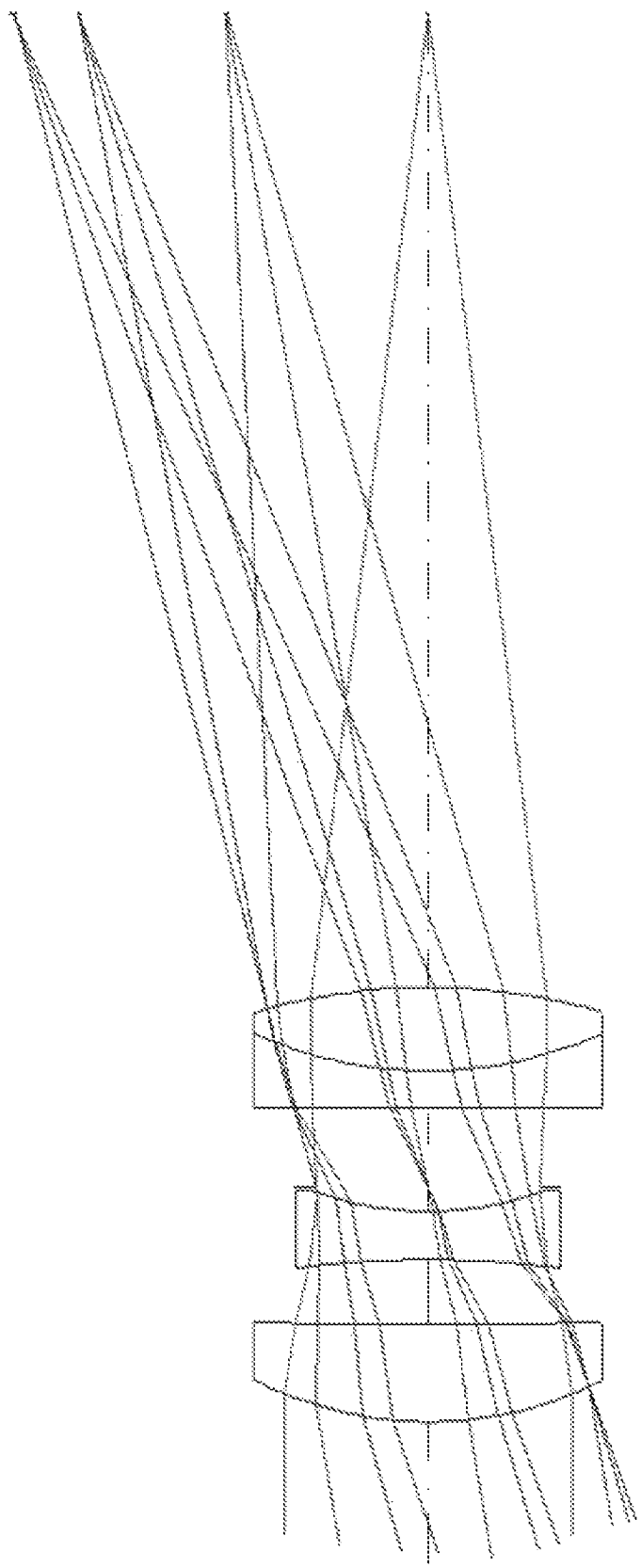
FIG. 1 is a schematic structural diagram of a lens system of a Tessar lens.

Reference numerals: 10 refers to first lens, 11 refers to first surface, 12 refers to second surface, 20 refers to second lens, 21 refers to third surface, 22 refers to fourth surface, 30 refers to third lens, 31 refers to fifth surface, 32 refers to sixth surface, 40 refers to fourth lens, 41 refers to seventh surface, 42 refers to eighth surface, 50 refers to image plane, 60 refers to aperture diaphragm, and 70 refers to vignetting diaphragm.

DETAILED DESCRIPTION

In order to further understand the features, the technical means, and the achieved specific objectives and functions of the present invention, the present invention is further described in detail hereinafter with reference to the accompanying drawings and the specific embodiments.

Figure 2:
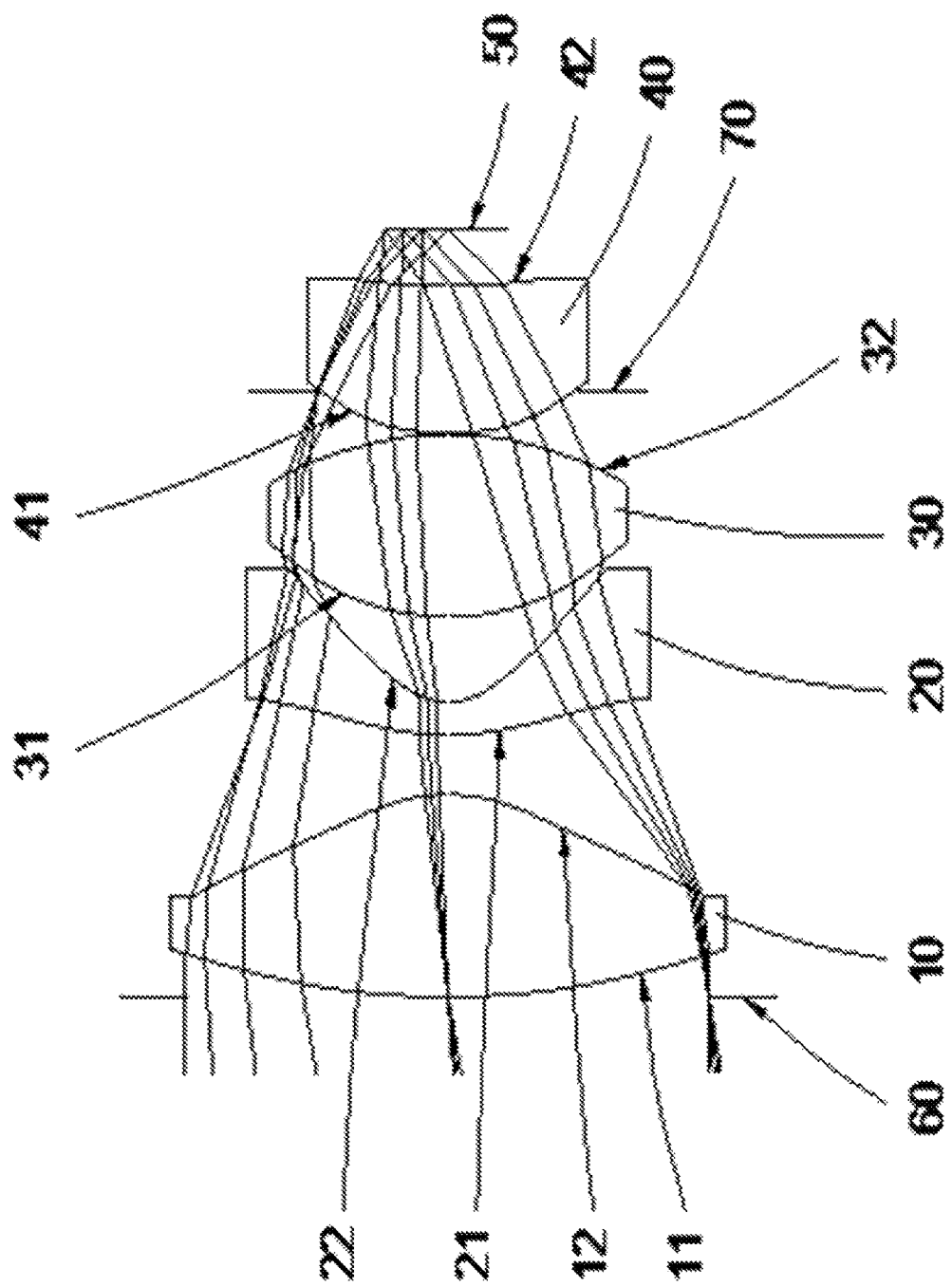
FIG. 2 is a schematic structural diagram of Embodiment 1 of the present invention.
Figure 4:
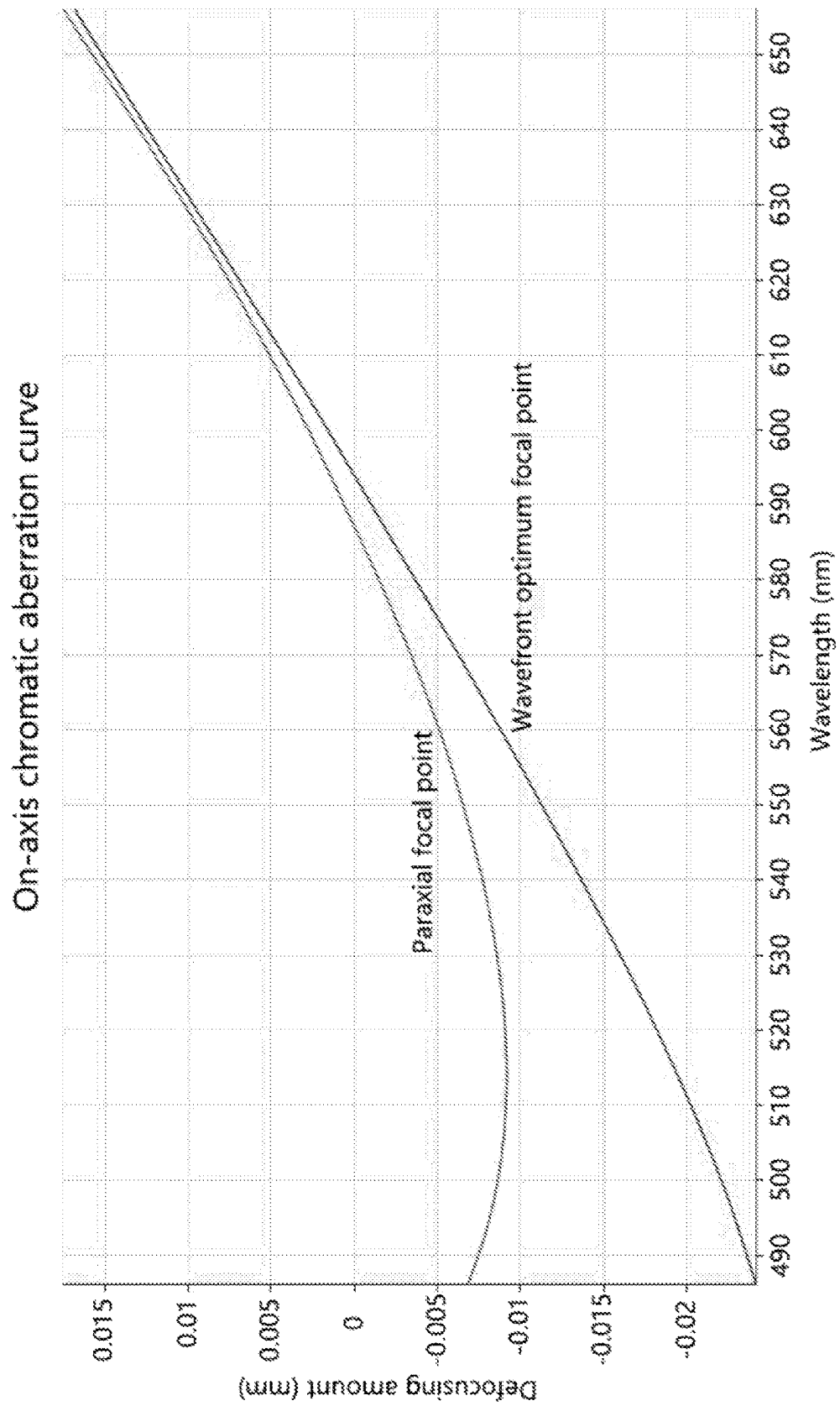
FIG. 4 is a graph of an on-axis chromatic aberration curve in Embodiment 1 of the present invention.
Figure 5:
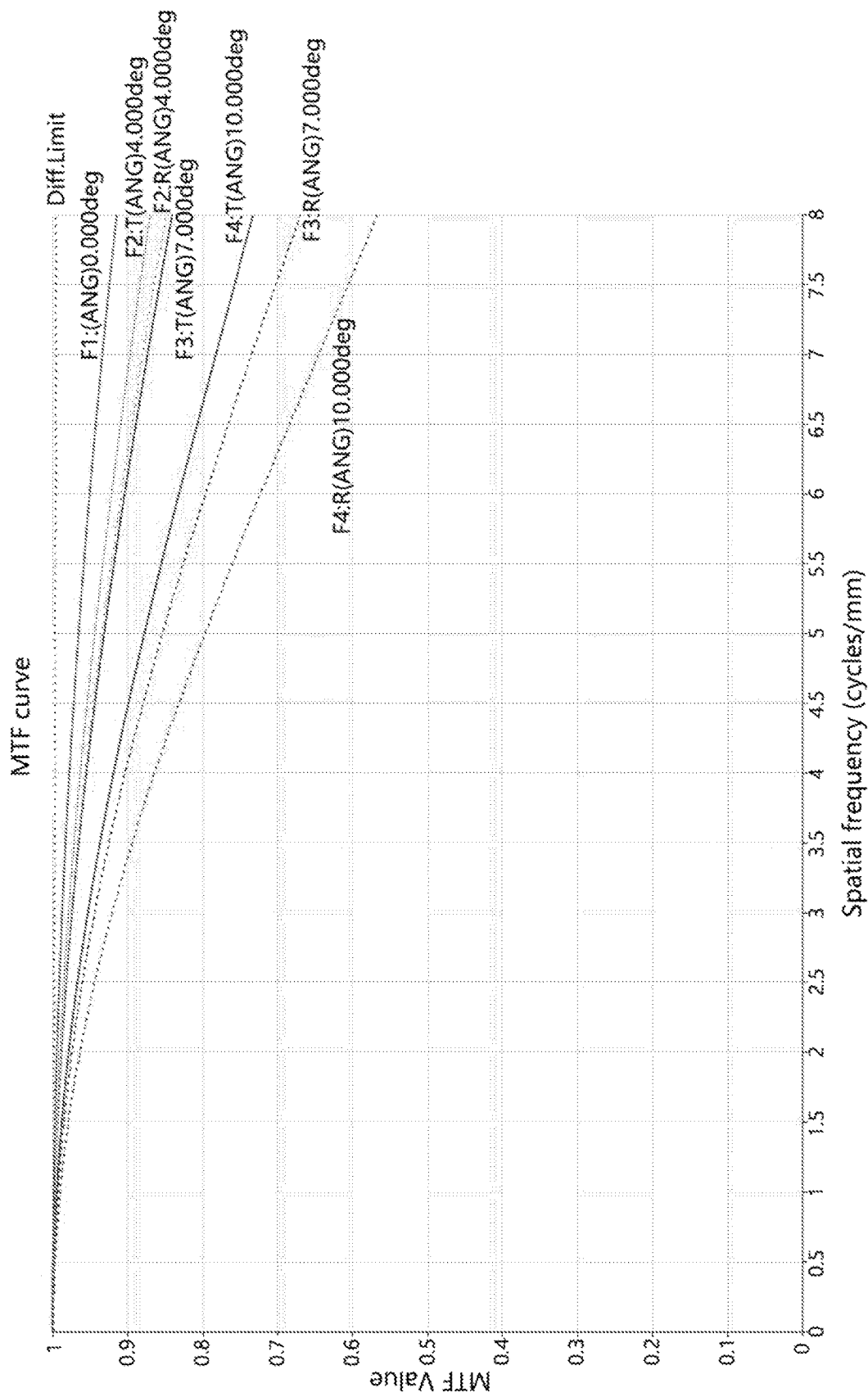
FIG. 5 is a graph of a MTF curve in Embodiment 1 of the present invention.
Figure 6:
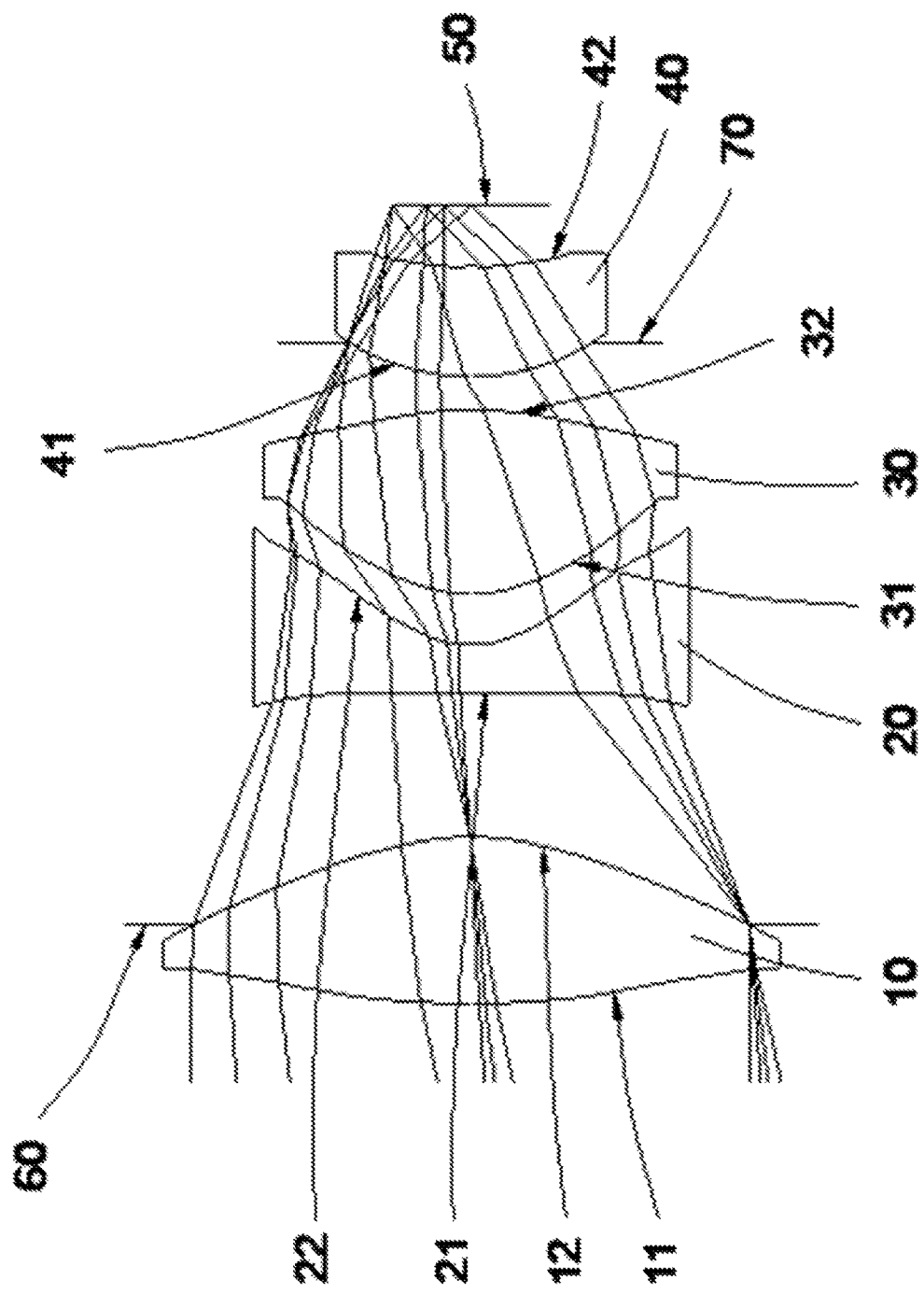
FIG. 6 is a schematic structural diagram of Embodiment 2 of the present invention.

With reference to FIG. 1 to FIG. 9, a basic embodiment of the present invention discloses a large-aperture four-piece optical lens, which comprises a first lens 10 with positive focal power, a second lens 20 with negative focal power, a third lens 30 with positive focal power and a fourth lens 40 with positive focal power which are sequentially arranged along a light incident direction (e.g., rightward direction of each of FIGS. 2 and 6) from an object side (e.g., left side of each of FIGS. 2 and 6) to an image side (e.g., right side of each of FIGS. 2 and 6). Two surfaces of the first lens 10 are an S1 surface i.e., a first surface) 11 facing toward the object side and an S2 surface (i.e., a second surface) 12 facing toward the image side, two surfaces of the second lens 20 are an S3 surface i.e., a third surface) 21 facing toward the object side and an S4 surface (i.e., a fourth surface) 22 facing toward the image side, two surfaces of the third lens 30 are an S5 surface (i.e., a fifth surface) 31 facing toward the object side and an S6 surface (i.e., a sixth surface) 32 facing toward the image side, and two surfaces of the fourth lens 40 are an S7surface (i.e., a seventh surface) 41 facing toward the object side and an S8 surface (i.e., an eighth surface) 42 facing toward the image side. The S1 surface 11, the S2 surface 12, the S3 surface 21, the S4 surface 22, the S5 surface 31, the S6 surface 32, the S7 surface 41 and the S8 surface 42 are sequentially arranged along a light incident direction from the object side to the image side. An image plane 50 is provided on the image side of the whole optical lens to face the S8 surface 42, and the image plane 50 is a plane on which the image is formed, which means that the image plane 50 is located at an image focal point of a whole optical lens. An aperture diaphragm 60 is arranged on the object side of the S1surface 11 or arranged between the S2 surface 12 and the S3 surface 21. Ideally, the aperture diaphragm 60 is located on the object side of the S1 surface 11. When applied to a vehicle headlight lens, considering a modeling design requirement, the aperture diaphragm 60 may be arranged between the S2 surface 12 and the S3 surface 21, so that a structural body of the aperture diaphragm 60 can be hidden inside the lens, and the structural body of the aperture diaphragm 60 cannot be observed outside the vehicle headlight lens. A vignetting diaphragm 70 is arranged on the S7 surface 41, and the vignetting diaphragm 70 is generally a lens mount. The S1 surface 11, the S2 surface 12, the S5 surface 31, the S6 surface 32 and the S7 surface 41 are all convex surfaces, and the S4 surface 22 is a concave surface.

A distance between the aperture diaphragm 60 and an object focal point of the whole optical lens is $|ST-F_{obj}|$, ST represents a distance between the aperture diaphragm 60 and a center of the whole optical lens, and $F_{obj}$ represents a distance between the object focal point of the whole optical lens and the center of the whole optical lens. A focal length of the whole optical lens is $f_0$, and in practical application, the object focal point of the whole optical lens may be inside the first lens 10, so that the aperture diaphragm 60 is arranged near the object focal point of the whole optical lens, which means that the following formula: $|ST-F_{obj}|<0.7f_0$ is satisfied.

An effective diameter of light passing through the S1 surface 11 is $d_1$, an effective diameter of light passing through the S2 surface 12 is $d_2$, an effective diameter of light passing through the S3 surface 21 is $d_3$, an effective diameter of light passing through the S4 surface 22 is $d_4$, an effective diameter of light passing through the S5 surface 31 is $d_5$, an effective diameter of light passing through the S6 surface 32 is $d_6$, an effective diameter of light passing through the S7 surface 41 is $d_7$, and an effective diameter of light passing through the S8 surface 42 is $d_8$. The effective diameters $d_1 \sim d_8$ of the light passing through the S1 surface 11 to the S8 surface 42 satisfy the following relationship: $d_i>0.9d_j$, $i<j$, i is an integer ranging from 1 to 7, j is an integer ranging from 2 to 8, and d is an effective diameter of the light passing through a corresponding optical surface. Along a light incident direction, the effective diameters of the light passing through the S1 surface 11 to the S8 surface 42 are changed basically conforming to a trend of gradual decrease.

A radius of curvature of the S3 surface 21 is $r_3$, a radius of curvature of the $S_4$ surface 22 is $r_4$, $|r_4|<|r_3|$, and a radius of curvature of the S7 surface 41 is $r_7$, a radius of curvature of the S8 surface 42 is $r_8$, $|r_7|<|r_8|$. An equivalent focal length of the fourth lens 40 is greater than that of the third lens 30, that is, $f_4>f_3$, and the equivalent focal length of the fourth lens 40 is greater than that of the first lens 10, that is, $f_4>f_1$.

A distance between centers of the S6 surface 32 and the S7 surface 41 is $G_{67}$, and a distance between centers of the S2 surface 12 and the S3 surface 21 is $G_{23}$, $G_{67}<G_{23}$.

In operation, a ray sequentially reaches the S1 surface 11, the S2 surface 12, the S3 surface 21, the S4 surface 22, the S5 surface 31, the S6 surface 32, the S7 surface 41, the S8 surface 42 and the image plane 50. The optical lens of the present invention can significantly improve a chromatic dispersion performance of a vehicle headlight, and reduce a sensitivity of the lens to axial tolerance in assembly, with a high assembly tolerance rate and a low assembly difficulty.

For a Tessar lens based on a classic Cook's three-piece variant, as shown in FIG. 1, the aperture diaphragm is generally arranged at a middle lens, which can reduce or correct common aberration, such as field curvature, astigmatism and chromatic aberration, through structural symmetry. However, this structure, on one hand, may lead to a small numerical aperture for describing an overall light energy utilization rate; and on the other hand, may also lead to a very large chief ray angle CRA of a chief ray of a large field of view on an image surface. An illumination intensity of a general light source satisfies a Lambert's cosine law, and the illumination intensity is maximum at a 0-degree position, decays to 0.5 at a 60-degree position, and is 0 at a 90-degree position. Due to a large chief ray angle CRA, it is indicated that energy obtained by the lens system is lower for a solid angle of the same size.

According to the present invention, the aperture diaphragm 60 is arranged at the object focal point of the optical lens, thus forming an image space telecentric lens, so that the chief rays of the fields of view are parallel, that is, the chief ray angles CRA of the chief rays of the fields of view on the image plane 50 are all 0 degree, which means that the energy utilization rate of the present invention is higher for the solid angle of the same size. In practical application, the aperture diaphragm 60 is arranged near the object focal point of the optical lens, and the chief ray angles of the chief rays of the fields of view on the image plane 50 are all less than 20 degrees, with a high energy utilization rate.

In the embodiment, a back focal length of the whole optical lens is greater than 2 mm, which means that a distance between the S8 surface 42 and the image 50 is greater than 2 mm. Since the light source may generate a certain amount of heat in use, the four-piece optical lens provided with sufficient rear intercept can effectively avoid deformation of parts caused by heating.

In the embodiment, the S8 surface 42 is a flat surface or a concave surface.

In the embodiment, the S1 surface 11, the S2 surface 12, the S3 surface 21, the S4 surface 22, the S5 surface 31, the S6 surface 32, the S7 surface 41 and the S8 surface 42 are spherical surfaces or aspherical surfaces, which means that the S1 surface 11 to the S8 surface 42 may all be spherical surfaces, or the S1 surface 11 to the S8 surface 42 may all be aspherical surfaces, or the S1 surface 11 to the S8 surface 42 comprise spherical surfaces and aspherical surfaces. The aspherical surface is a rationally designed surface type.

In the embodiment, the first lens 10, the second lens 20, the third lens 30 and the fourth lens 40 are single lenses or cemented lenses, which means that the first lens 10, the second lens 20, the third lens 30 and the fourth lens 40 may all be single lenses, or the first lens 10, the second lens 20, the third lens 30 and the fourth lens 40 may all be cemented lenses, or the first lens 10, the second lens 20, the third lens 30 and the fourth lens 40 comprise single lenses and cemented lenses. The cemented lens, also known as an achromatic lens, is formed by cementing two single lenses, and a multi-color imaging performance of the cemented lens is much better than that of the single lens.

In the embodiment, the first lens 10, the second lens 20, the third lens 30 and the fourth lens 40 are glass lenses or plastic lenses, which means that the first lens 10, the second lens 20, the third lens 30 and the fourth lens 40 may all be glass lenses, or the first lens 10, the second lens 20, the third lens 30 and the fourth lens 40 may all be plastic lenses, or the first lens 10, the second lens 20, the third lens 30 and the fourth lens 40 comprise glass lenses and plastic lenses.

In the embodiment, an Abbe number of the first lens 10 is $Vd_1$, an Abbe number of the second lens 20 is $Vd_2$, an Abbe number of the third lens 30 is $Vd_3$, and an Abbe number of the fourth lens 40 is $Vd_4$, $Vd_1-Vd_2>25$, and $Vd_3-Vd_2>25$.

In Embodiment 1, a structure of an optical lens is shown in FIG. 2, and the optical lens is arranged according to Table 1, Table 2, Table 3 and Table 4 below.

TABLE 1

Parameters of surfaces in Embodiment 1

| Serial No. of surface | Type of surface | Radius of curvature r (mm) | Thickness (mm) | Refractive index n | Abbe number Vd | Effective diameter d |
|---|---|---|---|---|---|---|
| Object surface | Spherical surface | Infinity | 25,000 | | | |
| Aperture diaphragm | Spherical surface | Infinity | 0.00 | | | 41.88 |
| S1 | Aspherical surface | 46.83 | 15.42 | 1.492 | 57.98 | 41.89 |
| S2 | Aspherical surface | −10.40 | 4.50 | | | 41.08 |
| S3 | Aspherical surface | 20.42 | 2.43 | 1.584 | 27.86 | 30.35 |
| S4 | Aspherical surface | 4.62 | 6.56 | | | 25.75 |
| S5 | Spherical surface | 20.99 | 13.80 | 1.487 | 70.42 | 26.50 |
| S6 | Spherical surface | −30.17 | 0.09 | | | 25.59 |
| S7 | Spherical surface | 17.96 | 11.24 | 1.755 | 52.30 | 20.65 |
| S8 | Spherical surface | 54.09 | 4.31 | | | 14.42 |
| Image plane | Spherical surface | Infinity | 0.00 | | | 10.00 |

An expression of the aspherical surface is as follows:

$$z = \frac{cr^2}{1+\sqrt{1-(1+k)c^2r^2}} + Ar^4 + Br^6 + Cr^8 + Dr^{10} + Er^{12} + Fr^{14} + Gr^{16} + Hr^{18} + Jr^{20}$$

wherein z is a vector height of an r position on the aspherical surface, c is a paraxial curvature of the aspherical surface, $c=1/r$, r is a radius of curvature, k is a conic coefficient, and A to J are higher-order coefficients.

TABLE 2

Parameters of aspherical surfaces in Embodiment 1

| | S1 | S2 | S3 | S4 |
|---|---|---|---|---|
| Conic coefficient k | 0 | −4.932 | −8.84E−01 | −1.77E+00 |
| A | −1.90E−05 | 1.10E−05 | −1.07E−04 | 5.28E−06 |
| B | 9.32E−08 | −4.95E−08 | 3.52E−07 | 1.25E−07 |
| C | −3.69E−10 | 6.47E−11 | −6.71E−10 | −6.40E−10 |
| D | 6.38E−13 | 4.00E−16 | 3.73E−13 | 8.26E−13 |
| E | −3.68E−16 | 0 | 0 | 0 |
| Other higher-order coefficients are all 0 | | | | |

TABLE 3

Design parameters of optical lenses in Embodiment 1

| Parameter | focal length $f_0$ (mm) | $fl_1$ (mm) | $fl_2$ (mm) | $fl_3$ (mm) | $fl_4$ (mm) | Back focal length | f/EPD | Numerical aperture NA | 1/2 FOV (°) |
|---|---|---|---|---|---|---|---|---|---|
| Value | 28.3 | 19.00 | −10.81 | 27.85 | 31.41 | 4.30 | 0.67 | 0.74 | 10.0 |

TABLE 4

Constrained relationships in Embodiment 1

| Constrained relationship | Result |
|---|---|
| $|ST - F_{obj}| < 0.7f_0$ | $|ST - F_{obj}| = 12.81$ mm, so that the condition is satisfied |
| Effective diameter $d_i > 0.9d_j$ | It can be seen from Table 1 that the condition is satisfied |
| The S7 surface is provided with the vignetting diaphragm | A vignetting coefficient of ½ FOV is 0.45 |
| $|r_4| < |r_3|$ | It can be seen from Table 1 that the condition is satisfied |
| $r_4 < 0$ | It can be seen from Table 1 that the condition is satisfied |
| $f_4 > f_3$ | It can be seen from Table 3 that the condition is satisfied |
| $f_4 > f_1$ | It can be seen from Table 3 that the condition is satisfied |
| $|r_7| < |r_8|$ | It can be seen from Table 1 that the condition is satisfied |
| $G_{67} < G_{23}$ | It can be seen from Table 1 that the condition is satisfied |
| The back focal length is greater than 2 mm | It can be seen from Table 3 that the rear intercept is 4.3 mm, and the condition is satisfied |

Figure 3:
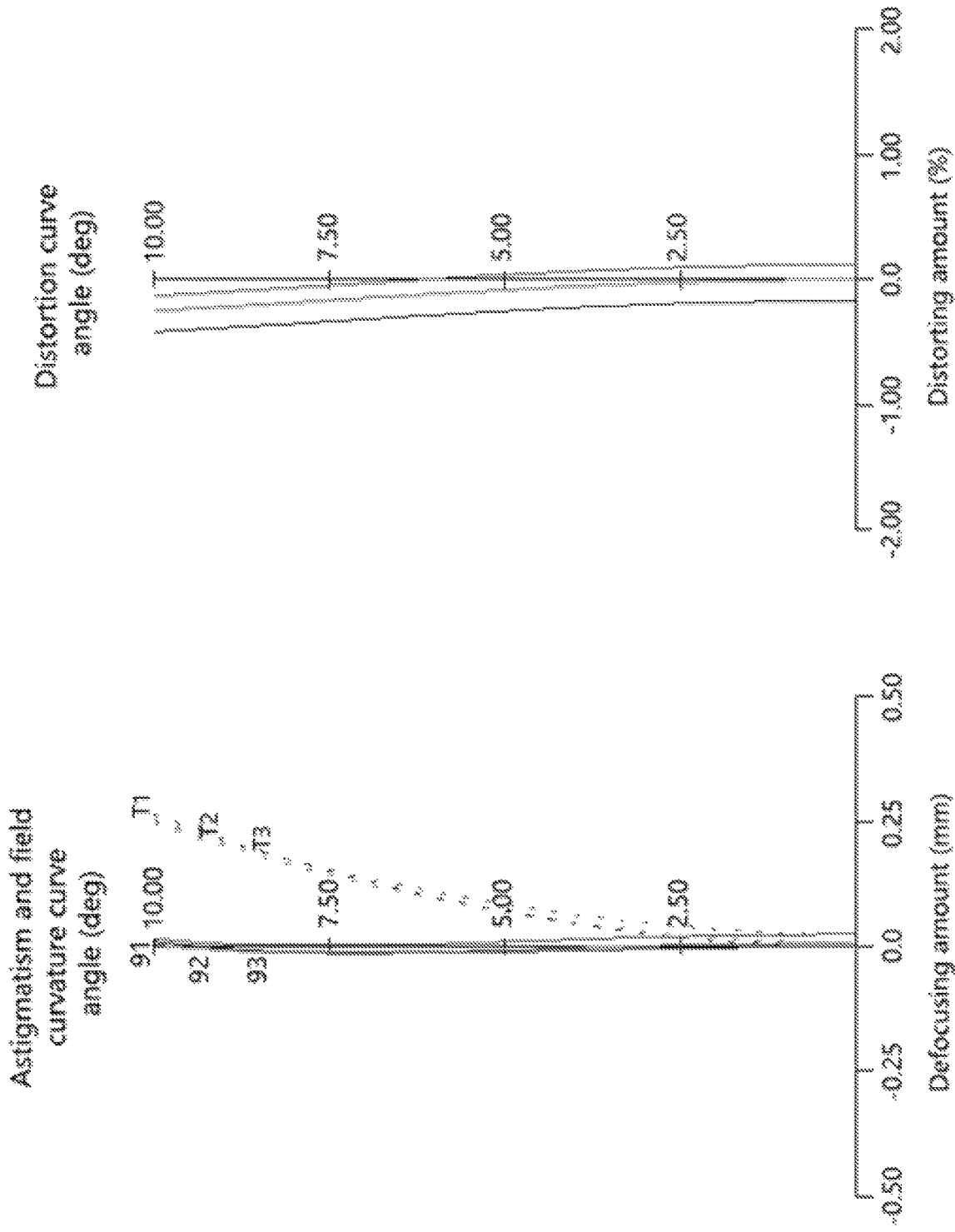
FIG. 3 is a graph of an astigmatism and field curvature curve and a distortion curve in Embodiment 1 of the present invention.

To sum up, it can be seen that the numerical aperture in Embodiment 1 reaches 0.74, which is much greater than 0.125 of the Tessar lens, so that the energy utilization rate is significantly improved. An astigmatism and field curvature curve and a distortion curve in Embodiment 1 are shown in FIG. 3, an on-axis chromatic aberration curve is shown in FIG. 4, and a MTF (Modulation Transfer Function) curve is shown in FIG. 5. It can be seen that the optical lens has a good imaging quality when applied to a projection imaging system.

In Embodiment 2, a structure of an optical lens is shown in FIG. 6, and the optical lens is arranged according to Table 5, Table 6, Table 7 and Table 8 below.

TABLE 5

Parameters of surfaces in Embodiment 2

| Serial No. of surface | Type of surface | Radius of curvature r (mm) | Thickness (mm) | Refractive index n | Abbe number Vd | Effective diameter d |
|---|---|---|---|---|---|---|
| Object surface | Spherical surface | Infinity | 25000 | | | |
| S1 | Aspherical surface | 42.622 | 8.510 | 1.492 | 57.98 | 28.93 |
| S2 (aperture diaphragm) | Aspherical surface | −12.870 | 7.441 | | | 28.16 |
| S3 | Aspherical surface | −115.860 | 2.390 | 1.584 | 27.86 | 20.16 |
| S4 | Aspherical surface | 4.641 | 2.626 | | | 18.30 |
| S5 | Aspherical surface | 7.185 | 9.354 | 1.586 | 60.60 | 19.07 |
| S6 | Aspherical surface | −22.594 | 1.789 | | | 17.65 |
| S7 | Spherical surface | 11.890 | 5.613 | 1.755 | 52.30 | 12.47 |
| S8 | Spherical surface | 20.294 | 3.115 | | | 9.74 |
| Image plane | Spherical surface | Infinity | 0.00 | | | 7.99 |

An expression of the aspherical surface is as follows:

$$z = \frac{cr^2}{1 + \sqrt{1 - (1+k)c^2 r^2}} + Ar^4 + Br^6 + Cr^8 + Dr^{10} + Er^{12} + Fr^{14} + Gr^{16} + Hr^{18} + Jr^{20}$$

wherein z is a vector height of an r position on the aspherical surface, c is a paraxial curvature of the aspherical surface, $c=1/r$, r is a radius of curvature, k is a conic coefficient, and A to J are higher-order coefficients.

TABLE 6

Parameters of aspherical surfaces in Embodiment 2

| | S1 | S2 | S3 | S4 | S5 | S6 |
|---|---|---|---|---|---|---|
| Conic coefficient k | −7.17110872 | −5.588 | 9.36E+00 | −2.54E+00 | −2.88 | −25.40 |
| A | 3.56E−06 | 2.36E−06 | 7.44E−05 | 8.32E−05 | 6.35E−05 | −2.22E−04 |
| B | −8.65E−08 | −2.25E−08 | −1.42E−06 | 5.47E−07 | 1.04E−06 | 3.70E−06 |
| C | 2.83E−10 | −8.74E−11 | 1.14E−08 | −4.13E−08 | −8.28E−09 | −1.79E−08 |
| D | −6.66E−13 | 2.12E−13 | −1.02E−10 | 2.43E−10 | 0E+00 | 0.00E+00 |
| E | 0.00E+00 | 0E+00 | 4.73E−13 | 0E+00 | 0E+00 | 0E+00 |

Other higher-order coefficients are all 0

TABLE 7

Design parameters of optical lenses in Embodiment 2

| Parameter | focal length $f_0$ (mm) | $fl_1$ (mm) | $fl_2$ (mm) | $fl_3$ (mm) | $fl_4$ (mm) | Back focal length | f/EPD | Numerical aperture NA | 1/2 FOV (°) |
|---|---|---|---|---|---|---|---|---|---|
| Value | 18.89 | 21.10 | −7.51 | 10.49 | 29.41 | 3.12 | 0.67 | 0.75 | 12.0 |

TABLE 8

Constrained relationships in Embodiment 2

| Constrained relationship | Result |
|---|---|
| $|ST - F_{obj}| < 0.7f_0$ | $|ST - F_{obj}| = 6.62$ mm, so that the condition is satisfied |
| Effective diameter $d_i > 0.9d_j$ | It can be seen from Table 5 that the condition is satisfied |
| The S7 surface is provided with the vignetting diaphragm | A vignetting coefficient of ½ FOV is 0.72 |
| $|r_4| < |r_3|$ | It can be seen from Table 5 that the condition is satisfied |
| $r_4 < 0$ | It can be seen from Table 5 that the condition is satisfied |
| $f_4 > f_3$ | It can be seen from Table 7 that the condition is satisfied |
| $f_4 > f_1$ | It can be seen from Table 7 that the condition is satisfied |
| $|r_7| < |r_8|$ | It can be seen from Table 5 that the condition is satisfied |
| $G_{67} < G_{23}$ | It can be seen from Table 5 that the condition is satisfied |
| The back focal length is greater than 2 mm | It can be seen from Table 7 that the rear intercept is 3.12 mm, and the condition is satisfied |

Figure 7:
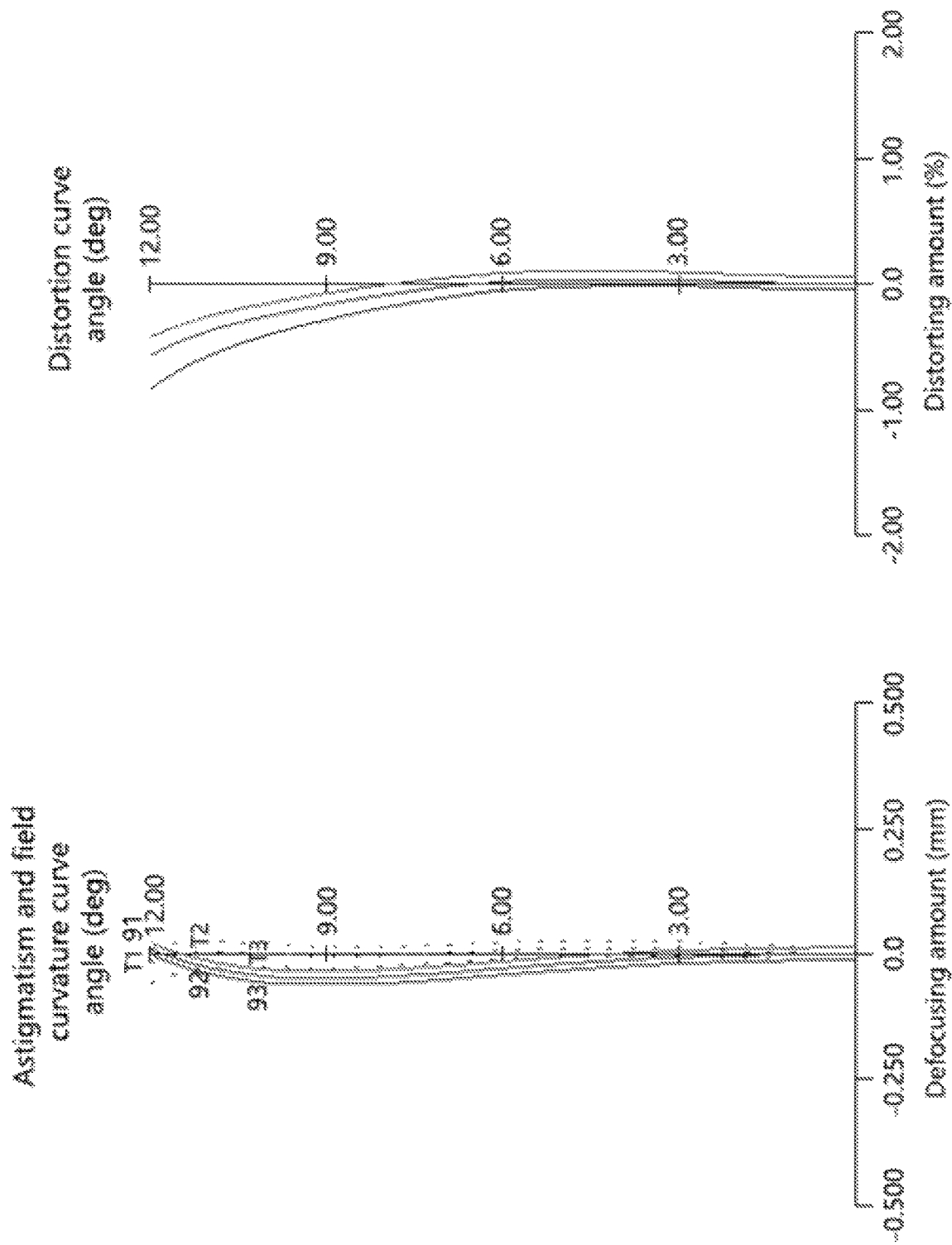
FIG. 7 is a graph of an astigmatism and field curvature curve and a distortion curve in Embodiment 2 of the present invention.
Figure 8:
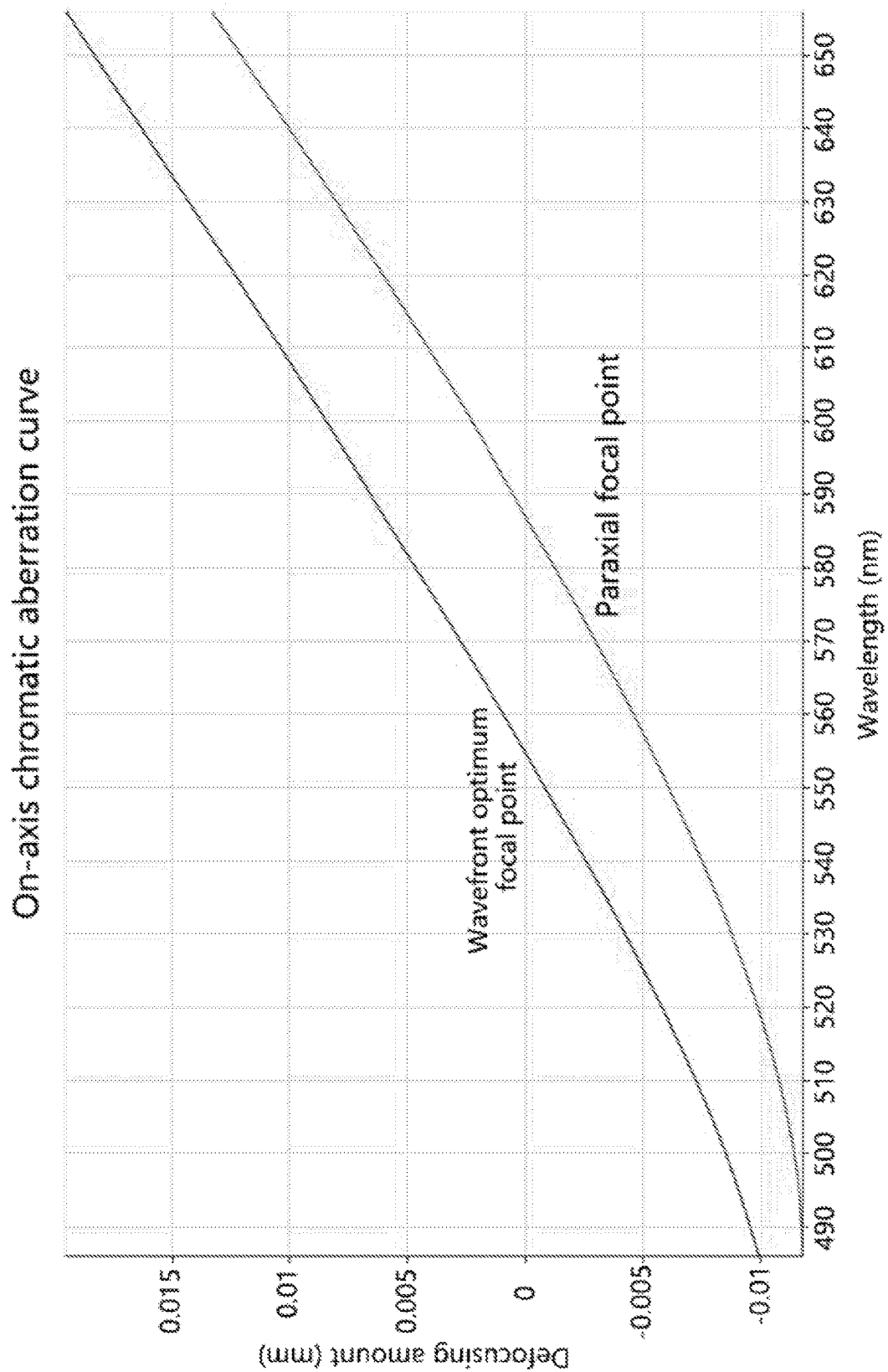
FIG. 8 is a graph of an on-axis chromatic aberration curve in Embodiment 2 of the present invention.
Figure 9:
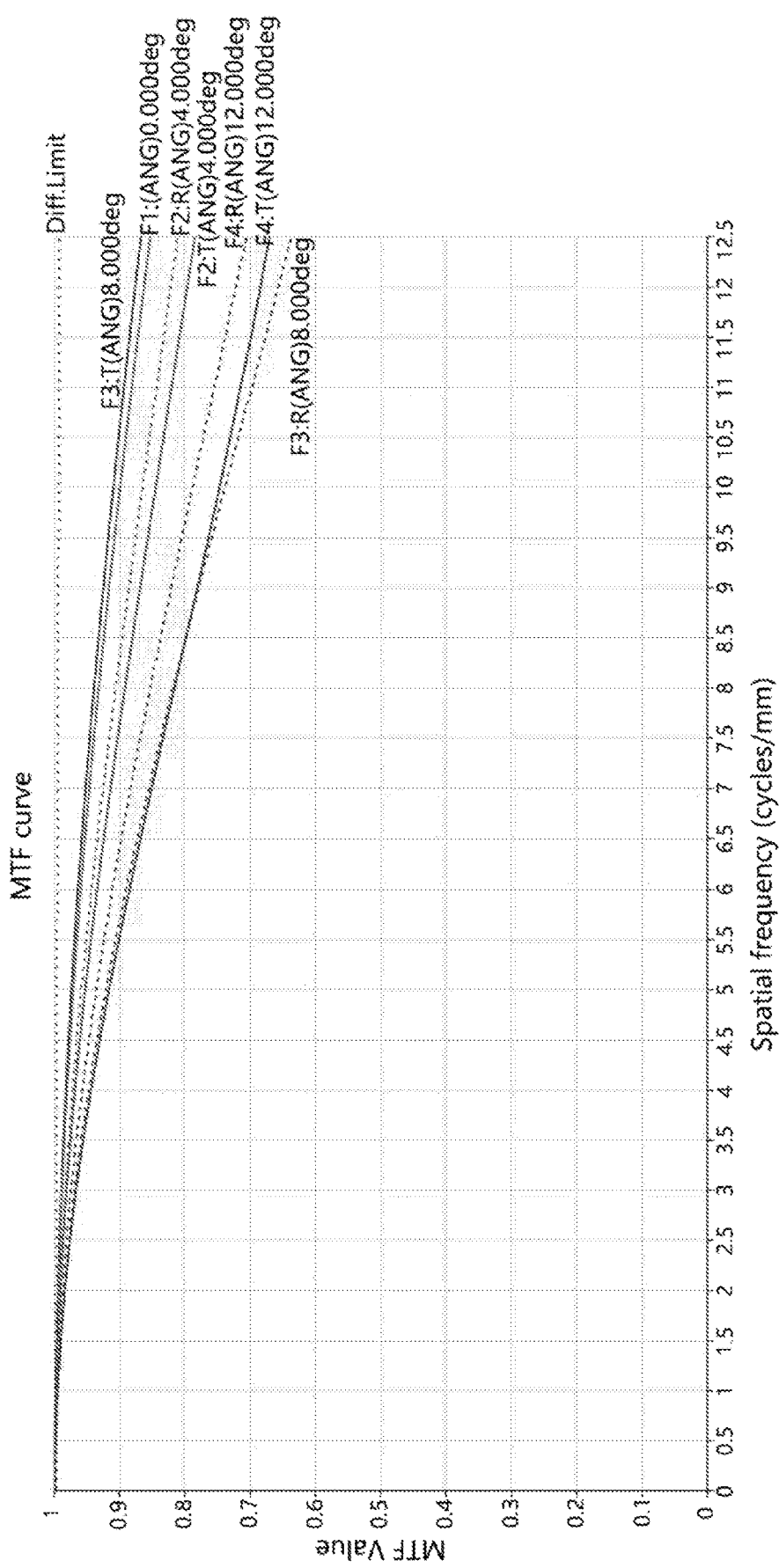
FIG. 9 is a graph of a MTF curve in Embodiment 2 of the present invention.

To sum up, it can be seen that the numerical aperture in Embodiment 2 reaches 0.75, which is much greater than 0.125 of the Tessar lens, so that the energy utilization rate is significantly improved. An astigmatism and field curvature curve and a distortion curve in Embodiment 2 are shown in FIG. 7, an on-axis chromatic aberration curve is shown in FIG. 8, and a MTF (Modulation Transfer Function) curve is shown in FIG. 9. It can be seen that the optical lens has a good imaging quality when applied to a projection imaging system.

The above embodiments only express some implementation modes of the present invention, and the descriptions thereof are specific and detailed, but cannot be understood as limiting the scope of the patent of the present invention. It shall be pointed out that those of ordinary skills in the art may further make several modifications and improvements without departing from the concept of the present invention, and these modifications and improvements all fall within the scope of protection of the present invention. Therefore, the scope of protection of the patent of the present invention shall be subject to the appended claims.

What is claimed is:

1. A large-aperture four-piece optical lens, comprising:
a first lens (10) with positive focal power;
a second lens (20) with negative focal power;
a third lens (30) with positive focal power; and
a fourth lens (40) with positive focal power;
wherein:
the first lens (10), the second lens (20), the third lens (30) and the fourth lens (40) are arranged sequentially along a light incident direction from an object side to an image side;
the first lens (10) includes a first surface (11) facing toward the object side and a second surface (12) facing toward the image side;

the second lens (20) includes a third surface (21) facing toward the object side and a fourth surface (22) facing toward the image side;

the third lens (30) includes a fifth surface (31) facing toward the object side and a sixth surface (32) facing toward the image side;

the fourth lens (40) includes a seventh surface (41) facing toward the object side and an eighth surface (42) facing toward the image side;

the first surface (11), the second surface (12), the third surface (21), the fourth surface (22), the fifth surface (31), the sixth surface (32), the seventh surface (41) and the eighth surface (42) are sequentially arranged along the light incident direction from the object side to the image side;

an image plane (50) is provided on the image side of the large-aperture four-piece optical lens to face the eighth surface (42);

an aperture diaphragm (60) is arranged on the object side of the large-aperture four-piece optical lens to face the first surface (11) or arranged between the second surface (12) and the third surface S3 (21);

a vignetting diaphragm (70) is arranged on the seventh surface (41);

the first surface (11), the second surface (12), the fifth surface (31), the sixth surface (32) and the seventh surface (41) are all convex surfaces, and the fourth surface (22) is a concave surface;

a distance between the aperture diaphragm (60) and a center of the large-aperture four-piece optical lens is ST, a distance between an object focal point of the large-aperture four-piece optical lens and the center of the large-aperture four-piece optical lens is $F_{obj}$, a distance between the aperture diaphragm (60) and the object focal point of the large-aperture four-piece optical lens is $|ST-F_{obj}|$, a focal length of the large-aperture four-piece optical lens is $f_0$, and $|ST-F_{obj}|<0.7f_0$;

an effective diameter of light passing through the first surface (11) is $d_1$, an effective diameter of light passing through the second surface (12) is $d_2$, an effective diameter of light passing through the third surface (21) is $d_3$, an effective diameter of light passing through the fourth surface (22) is $d_4$, an effective diameter of light passing through the fifth surface (31) is $d_5$, an effective diameter of light passing through the sixth surface (32) is $d_6$, an effective diameter of light passing through the seventh surface (41) is $d_7$, and an effective diameter of light passing through the eighth surface (42) is $d_8$;

the effective diameters d of the light passing through the first surface (11) to the eighth surface (42) satisfy the following relationship: $d_i>0.9d_j$, wherein i<j, i is an integer ranging from 1 to 7, and j is an integer ranging from 2 to 8;

a radius of curvature of the third surface (21) is $r_3$, a radius of curvature of the fourth surface (22) is $r_4$, $|r_4|<|r_3|$, a radius of curvature of the seventh surface (41) is $r_7$, a radius of curvature of the eighth surface (42) is $r_8$, $|r_7|<|r_8|$, an equivalent focal length of the fourth lens (40) is greater than that of the third lens (30), and the equivalent focal length of the fourth lens (40) is greater than that of the first lens (10); and a distance between centers of the sixth surface (32) and the seventh surface (41) is $G_{67}$, a distance between centers of the S2 surface (12) and the third surface (21) is $G_{23}$, and $G_{67}<G_{23}$.

2. The large-aperture four-piece optical lens according to claim 1, wherein a back focal length of the large-aperture four-piece optical lens is greater than 2 mm.

3. The large-aperture four-piece optical lens according to claim 1, wherein the eighth surface (42) is a flat surface or a concave surface.

4. The large-aperture four-piece optical lens according to claim 1, wherein the first surface (11), the second surface (12), the third surface (21), the fourth surface (22), the fifth surface (31), the sixth surface (32), the seventh surface (41) and the eighth surface (42) are spherical surfaces or aspherical surfaces.

5. The large-aperture four-piece optical lens according to claim 1, wherein the first lens (10), the second lens (20), the third lens (30) and the fourth lens (40) are single lenses or cemented lenses.

6. The large-aperture four-piece optical lens according to claim 1, wherein the first lens (10), the second lens (20), the third lens (30) and the fourth lens (40) are glass lenses or plastic lenses.

7. The large-aperture four-piece optical lens according to claim 1, wherein an Abbe number of the first lens (10) is $Vd_1$, an Abbe number of the second lens (20) is $Vd_2$, an Abbe number of the third lens (30) is $Vd_3$, and an Abbe number of the fourth lens (40) is $Vd_4$, $Vd_1-Vd_2>25$, and $Vd_3-Vd_2>25$.

* * * * *